United States Patent
Crawford et al.

(10) Patent No.: US 10,033,810 B2
(45) Date of Patent: Jul. 24, 2018

(54) RECOVERY POINT OBJECTIVE VIA DYNAMIC USAGE OF BIND SEGMENTS IN A GLOBAL MIRROR ENVIRONMENT

(71) Applicant: International Business Machines Corporation, Armonk, NY (US)

(72) Inventors: Joshua J. Crawford, Tucson, AZ (US); Paul A. Jennas, II, Tucson, AZ (US); Jason L. Peipelman, Austin, TX (US); Matthew J. Ward, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/957,986

(22) Filed: Dec. 3, 2015

(65) Prior Publication Data
US 2017/0160930 A1    Jun. 8, 2017

(51) Int. Cl.
*G06F 12/00* (2006.01)
*H04L 29/08* (2006.01)
(Continued)

(52) U.S. Cl.
CPC .......... *H04L 67/1095* (2013.01); *G06F 3/065* (2013.01); *G06F 3/067* (2013.01); *G06F 3/0613* (2013.01); *G06F 3/0643* (2013.01); *G06F 3/0647* (2013.01); *G06F 3/0685* (2013.01); *G06F 12/0804* (2013.01);
(Continued)

(58) Field of Classification Search
CPC .... G06F 17/00; G06F 13/00; G06F 17/30575; G06F 11/2056; G06F 11/2066

USPC ........ 711/114, 156, 162; 707/655, 658, 659, 707/660, 615, 637, 649, 690; 709/234
See application file for complete search history.

(56) References Cited

U.S. PATENT DOCUMENTS 5,734,818 A * 3/1998 Kern .................. G06F 11/2064
                                                                714/20
6,105,078 A    8/2000 Crockett et al.
(Continued)

FOREIGN PATENT DOCUMENTS

EP         2902907 A1    8/2015

OTHER PUBLICATIONS

Azagury et al., "Advanced functions for storage subsystems: Supporting continuous availability", IBM Systems Journal, vol. 42, No. 2, 2003, © 2003 IBM, pp. 268-279.
(Continued)

*Primary Examiner* — Reba I Elmore
(74) *Attorney, Agent, or Firm* — Gilbert Harmon, Jr.

(57) ABSTRACT

Embodiments for an approach to resource optimization during consistency group formation associated with a global mirror environment is provided. The approach detects when a primary volume associated with the consistency group has completed transmitting its out-of-sync (OOS) data towards its associated secondary volume. A command is sent to create a next consistency group sidefile so further writes can be sent to the sidefile rather than queueing at the primary volume. The approach repeats this process for each primary volume associated with the global mirror environment until all primary volumes are complete. Commands are sent to disable writes to the associated sidefiles and to merge the data stored in the sidefiles into normal cache as the next consistency group becomes the current consistency group.

20 Claims, 4 Drawing Sheets

(51) Int. Cl.
*G06F 3/06* (2006.01)
*G06F 12/0804* (2016.01)
*G06F 12/0813* (2016.01)

(52) U.S. Cl.
CPC .. *G06F 12/0813* (2013.01); *G06F 2212/1024* (2013.01); *G06F 2212/154* (2013.01); *G06F 2212/60* (2013.01); *G06F 2212/62* (2013.01)

(56) References Cited

U.S. PATENT DOCUMENTS

| | | | |
|---|---|---|---|
| 7,293,048 | B2 | 11/2007 | Cochran et al. |
| 7,600,089 | B2 | 10/2009 | Muto et al. |
| 8,150,805 | B1 | 4/2012 | Tawri et al. |
| 8,250,323 | B2 | 8/2012 | Benhase et al. |
| 8,626,722 | B2 | 1/2014 | Blea et al. |
| 8,793,456 | B2 | 7/2014 | Blea et al. |
| 9,026,696 | B1 | 5/2015 | Natanzon et al. |
| 9,135,120 | B1* | 9/2015 | Natanzon ............ G06F 11/1456 |
| 9,213,752 | B2* | 12/2015 | Clayton ............. H04L 67/1095 |
| 2005/0071708 | A1 | 3/2005 | Bartfai et al. |
| 2007/0028065 | A1 | 2/2007 | Spear et al. |
| 2007/0174185 | A1* | 7/2007 | McGoveran ........ G06F 11/1474 705/39 |
| 2008/0018948 | A1 | 1/2008 | Li et al. |
| 2008/0189485 | A1 | 8/2008 | Jung et al. |
| 2009/0006789 | A1* | 1/2009 | LaFrese .............. G06F 11/2074 711/156 |
| 2009/0043979 | A1* | 2/2009 | Jarvis .................. G06F 11/2064 711/162 |
| 2009/0070528 | A1 | 3/2009 | Bartfai et al. |
| 2009/0150627 | A1* | 6/2009 | Benhase ............. G06F 11/2082 711/162 |
| 2010/0241817 | A1* | 9/2010 | Oogai ................. G06F 11/0727 711/156 |
| 2013/0185494 | A1 | 7/2013 | Ash et al. |
| 2013/0232294 | A1 | 9/2013 | Benhase et al. |
| 2014/0059308 | A1 | 2/2014 | Blea et al. |
| 2014/0075114 | A1 | 3/2014 | Benhase et al. |
| 2014/0229434 | A1 | 8/2014 | Clayton et al. |
| 2014/0229694 | A1* | 8/2014 | Clayton ............. H04L 67/1095 711/162 |
| 2014/0279892 | A1 | 9/2014 | Bourbonnais et al. |
| 2016/0063008 | A1 | 3/2016 | Mu et al. |
| 2016/0063083 | A1 | 3/2016 | Mu et al. |

OTHER PUBLICATIONS

Crawford et al., "Recovery Point Objective via Dynamic Usage of Bind Segments in a Global Mirror Environment", U.S. Appl. No. 15/044,129, filed Feb. 16, 2016, 25 pages.

IBM Appendix P, list of patents or patent applications treated as related, Feb. 16, 2016, 2 pages.

* cited by examiner

RECOVERY POINT OBJECTIVE VIA DYNAMIC USAGE OF BIND SEGMENTS IN A GLOBAL MIRROR ENVIRONMENT

BACKGROUND OF THE INVENTION

The present invention relates generally to global mirror environment optimization and more specifically, to improved recover point objective (RPO) based on increased bandwidth utilization.

A global mirror environment is a multi-site data replication solution that scales and provides a cross volume/storage subsystem with data integrity and data consistency. During consistency group formation, different primary volumes complete their data transfers at different times, such that primary volumes that have completed their transfers will not transfer any more data until all the primary volumes associated with the current consistency group have completed their data transfer. Accordingly, writes to primary volumes that have completed their data transfers for the current consistency group are queued, leading to an increase in idle bandwidth as a greater number of primary volumes complete their data transfer for the current consistency group.

SUMMARY

According to an embodiment of the present invention, a method for increasing bandwidth utilization during consistency group formation, the method comprising: determining, by a primary storage device, if one or more of a plurality of primary volumes associated with the current consistency group has completed sending out-of-sync (OOS) data towards one or more secondary volumes associated with the plurality of primary volumes, respectively; responsive to the one or more of a plurality of primary volumes completing sending OOS data, sending, by the primary storage device, an "EnableNextCGSidefiles" command toward the plurality of secondary volumes, respectively; sending, by the primary storage device, change recording (CR) data toward the secondary volume; determining, by the primary storage device, if the plurality of primary volumes associated with the current consistency group have completed sending out-of-sync (OOS) data towards a plurality of secondary volumes associated with the plurality of primary volumes, respectively; responsive to the plurality of primary volumes completing sending OOS data, stop sending, by the primary storage device, CR data toward the plurality of secondary volumes, respectively; sending, by the primary storage device, a "DisableNextCGSidefiles" command toward the plurality of secondary volumes; and sending, by the primary storage device, a "HardenNextCGSidefiles" command toward the plurality of secondary volumes.

According to another embodiment of the present invention, a computer program product for increasing bandwidth utilization during consistency group formation, the computer program product comprising: one or more computer readable storage media and program instructions stored on the one or more computer readable storage media, the program instructions comprising: program instructions to, determine, by a primary storage device, if one or more of a plurality of primary volumes associated with the current consistency group has completed sending out-of-sync (OOS) data towards one or more secondary volumes associated with the plurality of primary volumes, respectively; responsive to the one or more of a plurality of primary volumes completing sending OOS data, program instructions to, send, by the primary storage device, an "EnableNextCGSidefiles" command toward the plurality of secondary volumes, respectively; program instructions to, send, by the primary storage device, change recording (CR) data toward the secondary volume; program instructions to, determine, by the primary storage device, if the plurality of primary volumes associated with the current consistency group have completed sending out-of-sync (OOS) data towards a plurality of secondary volumes associated with the plurality of primary volumes, respectively; responsive to the plurality of primary volumes completing sending OOS data, program instructions to, stop sending, by the primary storage device, CR data toward the plurality of secondary volumes, respectively; program instructions to, send, by the primary storage device, a "DisableNextCGSidefiles" command toward the plurality of secondary volumes; and program instructions to, send, by the primary storage device, a "HardenNextCGSidefiles" command toward the plurality of secondary volumes.

According to another embodiment of the present invention, a computer system for reducing intrusiveness to image subjects based on updating a configuration associated with image capture, the computer system comprising: one or more computer processors; one or more computer readable storage media; program instructions stored on the one or more computer readable storage media for execution by at least one of the one or more computer processors, the program instructions comprising: program instructions to, determine, by a primary storage device, if one or more of a plurality of primary volumes associated with the current consistency group has completed sending out-of-sync (OOS) data towards one or more secondary volumes associated with the plurality of primary volumes, respectively; responsive to the one or more of a plurality of primary volumes completing sending OOS data, program instructions to, send, by the primary storage device, an "EnableNextCGSidefiles" command toward the plurality of secondary volumes, respectively; program instructions to, send, by the primary storage device, change recording (CR) data toward the secondary volume; program instructions to, determine, by the primary storage device, if the plurality of primary volumes associated with the current consistency group have completed sending out-of-sync (OOS) data towards a plurality of secondary volumes associated with the plurality of primary volumes, respectively; responsive to the plurality of primary volumes completing sending OOS data, program instructions to, stop sending, by the primary storage device, CR data toward the plurality of secondary volumes, respectively; program instructions to, send, by the primary storage device, a "DisableNextCGSidefiles" command toward the plurality of secondary volumes; and program instructions to, send, by the primary storage device, a "HardenNextCGSidefiles" command toward the plurality of secondary volumes.

DETAILED DESCRIPTION

The embodiments depicted and described herein recognize the benefits of utilizing the extra cache capacity of a volume associated with a secondary server and the bandwidth available at a volume associated with a primary server once the volume has completed transferring its data for the current consistency group. Utilizing the extra cache capacity to hold a next consistency group (CG) the primary server can send write requests towards the secondary server for storage in the next consistency group instead of queueing the writes at the primary server until the current consistency group has completed. These embodiments provide for resource optimizations such as, but not limited to, increased bandwidth, disk, cache and cpu utilization towards the end of the current consistency group formation, resulting in a decrease in recovery point object (RPO) for the next consistency group. It should be noted that the resource optimizations are most prevalent when the primary servers experience varying workloads.

In describing embodiments in detail with reference to the figures, it should be noted that references in the specification to "an embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, describing a particular feature, structure or characteristic in connection with an embodiment, one skilled in the art has the knowledge to affect such feature, structure or characteristic in connection with other embodiments whether or not explicitly described.

Figure 1:
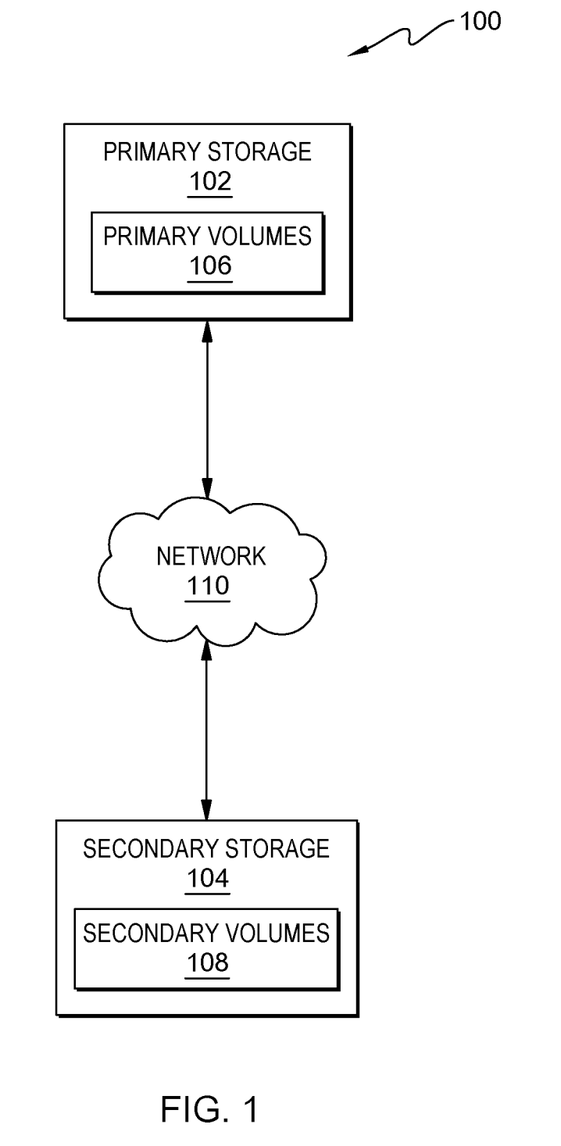
FIG. 1 is a functional block diagram generally depicting a global mirror environment, in accordance with an embodiment of the present invention.

FIG. 1 is a functional block diagram illustrating, generally, an embodiment of a global mirror environment 100. The global mirror environment 100 comprises one or more primary volumes 106 operating on one or more primary storage 102 computing devices, one or more secondary volumes 108 operating on one or more secondary storage 104 computing devices and a network 110 supporting communications between the primary storage 102 computing devices and the secondary storage 104 computing devices.

Primary storage 102 device can be a standalone computing device, management server, a web server, a mobile computing device, or any other electronic device or computing system capable of receiving, sending, and processing data. In other embodiments, primary storage 102 device can represent a server computing system utilizing multiple computers as a server system. In another embodiment, server computing device can be a laptop computer, a tablet computer, a netbook computer, a personal computer, a desktop computer, or any programmable electronic device capable of communicating with other computing devices (not shown) within global mirror environment 100 via network 110. In another embodiment, primary storage 102 device represents a computing system utilizing clustered computers and components (e.g., database server computers, application server computers, etc.) that act as a single pool of seamless resources when accessed within global mirror environment 100. Primary storage 102 device can include internal and external hardware components, as depicted and described in further detail with respect to FIG. 5. Primary volumes 106 can be one or more data storage devices such as, but not limited to hard disks and can be located on one or more primary storage 102 devices.

Network 110 can be, for example, a local area network (LAN), a wide area network (WAN) such as the Internet, or a combination of the two, and can include wired, wireless, or fiber optic connections. In general, network 110 can be any combination of connections and protocols that will support communications between primary storage 102 devices and secondary storage 104 devices.

Secondary storage 104 device can be a standalone computing device, management server, a web server, a mobile computing device, or any other electronic device or computing system capable of receiving, sending, and processing data. In other embodiments, secondary storage 104 device can represent a server computing system utilizing multiple computers as a server system. In another embodiment, server computing device can be a laptop computer, a tablet computer, a netbook computer, a personal computer, a desktop computer, or any programmable electronic device capable of communicating with other computing devices (not shown) within global mirror environment 100 via network 110. In another embodiment, secondary storage 104 device represents a computing system utilizing clustered computers and components (e.g., database server computers, application server computers, etc.) that act as a single pool of seamless resources when accessed within global mirror environment 100. Secondary storage 104 device can include internal and external hardware components, as depicted and described in further detail with respect to FIG. 5. Secondary volumes 108 can be one or more data storage devices such as, but not limited to hard disks.

Figure 2:
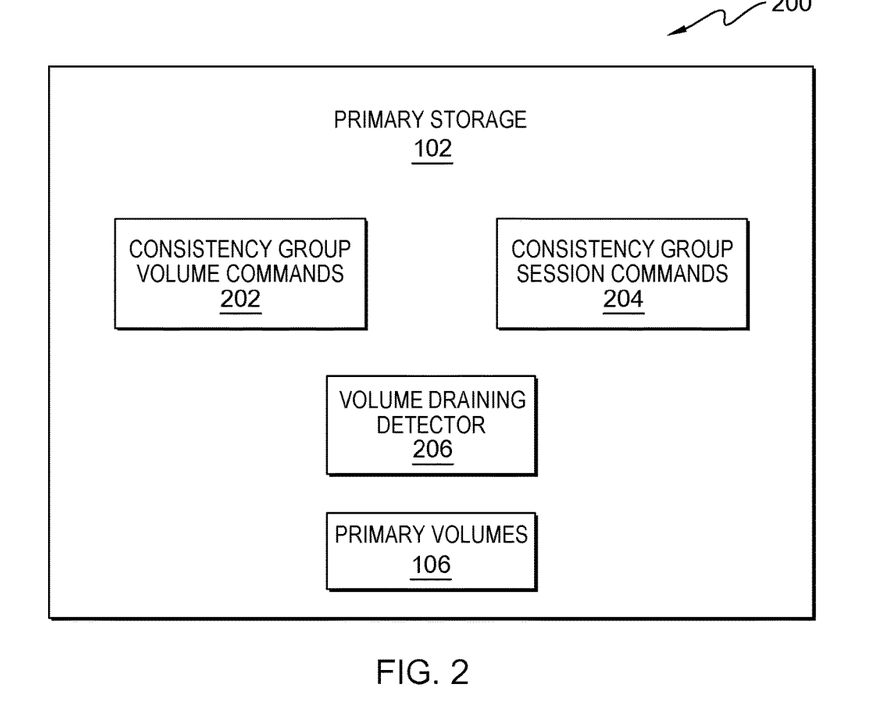
FIG. 2 is a functional block diagram depicting a primary storage component associated with a global mirror environment, in accordance with an embodiment of the present invention.

FIG. 2 is a functional block diagram 200 illustrating primary storage 102 device comprising consistency group volume commands 202, consistency group session commands 204, volume draining detector 206 and primary volumes 106.

Consistency group volume commands 202 of an embodiment of the present invention provides the command "EnableNextCGSidefiles" to instruct the one or more secondary volumes 108 of the secondary storage 104 devices that all future writes for the associated volumes are to be written to the "Next CG Sidefiles." It should be noted that this redirects the writes from the cache for the associated secondary volumes 108 so data for the next consistency group does not overwrite data for the previous consistency group. Further, the "Next CG Sidefiles" are data structures existing on the secondary volumes 108 of the secondary storage 104 devices of a global mirror environment 100, e.g., available and unused cache. The "Next CG Sidefiles" exist at the session level of the global mirror and each structure contains a list of secondary volumes 108 that currently have data that has been sent for the next consistency group. Each secondary volume 108 in this list has a list of sidefiles containing the data for the next consistency group. It should be noted that the space reserved for the "Next CG Sidefiles" determines the amount of data that can be written in advance of the next consistency group.

Consistency group volume commands 202 of an embodiment of the present invention further provides the command "DisableNextCGSidefiles." to instruct the one or more secondary volumes 108 of the secondary storage 104 devices that all future writes for the associated volume should no longer be written to the "Next CG Sidefiles." It should be noted that this redirects the writes from the "Next CG Sidefiles" for the associated volumes so data for the current consistency group can be collected and written to the cache. It should further be noted that the volume commands, e.g., "EnableNextCGSidefiles" and "DisableNextCGSidefiles," are executed on the one or more primary storage 102 devices.

Consistency group session commands 204 of an embodiment of the present invention provides the command "HardenNextCGSidefiles" to instruct the one or more secondary volumes 108 of the secondary storage 104 devices that all data contained in the "Next CG Sidefiles" for the plurality of secondary volumes 108 in the specified global mirror session and merge them into the cache. In another aspect of the embodiment of the present invention, consistency group session commands 204 provides the command "FlushNextCGSidefiles" to instruct the one or more secondary volumes 108 of the secondary storage 104 devices that all data contained in the "Next CG Sidefiles" for the plurality of secondary volumes 108 in the specified global mirror session should be cleared. It should further be noted that the session commands, e.g., "HardenNextCGSidefiles" and "FlushNextCGSidefiles," are executed on the one or more primary storage 102 devices.

Continuing with the embodiment of the present invention, volume draining detector 206 determines when a primary volume 106 has completed transferring its data to a secondary volume 108 for the current consistency group. For example, for the plurality of primary volumes 106 associated with a global mirror, the volume draining detector 206 monitors data indicating when individual primary volumes 106 have completed transferring their data for the current consistency group. When a primary volume 106 has completed transferring its data for the current consistency group, the volume draining detector issues the previously described consistency group volume commands 202 ("EnableNextCGSidefiles") to allow the primary volume 106 to continue sending data toward the associated secondary volume 108 and an associated "Next CG Sidefiles." Once the remaining plurality of primary volumes 106 have completed transferring their data, then the volume draining detector 206 can issue the previously described consistency group volume commands 202 ("DisableNextCGSidefiles," "HardenNextCGSidefiles" and "FlushNextCGSidefiles") to populate the cache consistency group with the data stored in the plurality of "Next CG Sidefiles."

Figure 3:
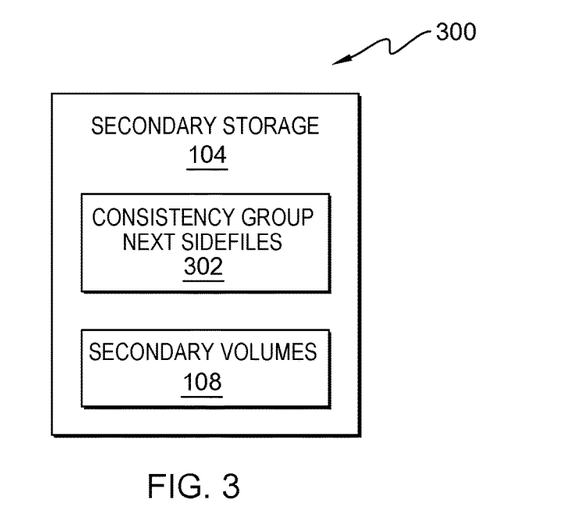
FIG. 3 is a functional block diagram depicting a secondary storage component associated with a global mirror environment, in accordance with an embodiment of the present invention.

FIG. 3 is a functional block diagram 300 illustrating secondary storage 104 device comprising consistency group next sidefiles 302 and secondary volumes 108. Consistency group next sidefiles 302 are storage locations created/generated out of available and unused cache. Consistency group next sidefiles 302 holds the data from a primary volume 106 coming after the primary volume has written all its data to the current consistency group, located on the cache of the secondary volume 108, in the period of time before all the primary volumes 106 associated with the global mirror have completed writing their data to the current consistency group. This prevents the writes from queueing on the primary volume 106 and provides for the utilization of idle bandwidth associated with the primary volumes 106 who have completed transferring their data associated with the current consistency group.

Figure 4:
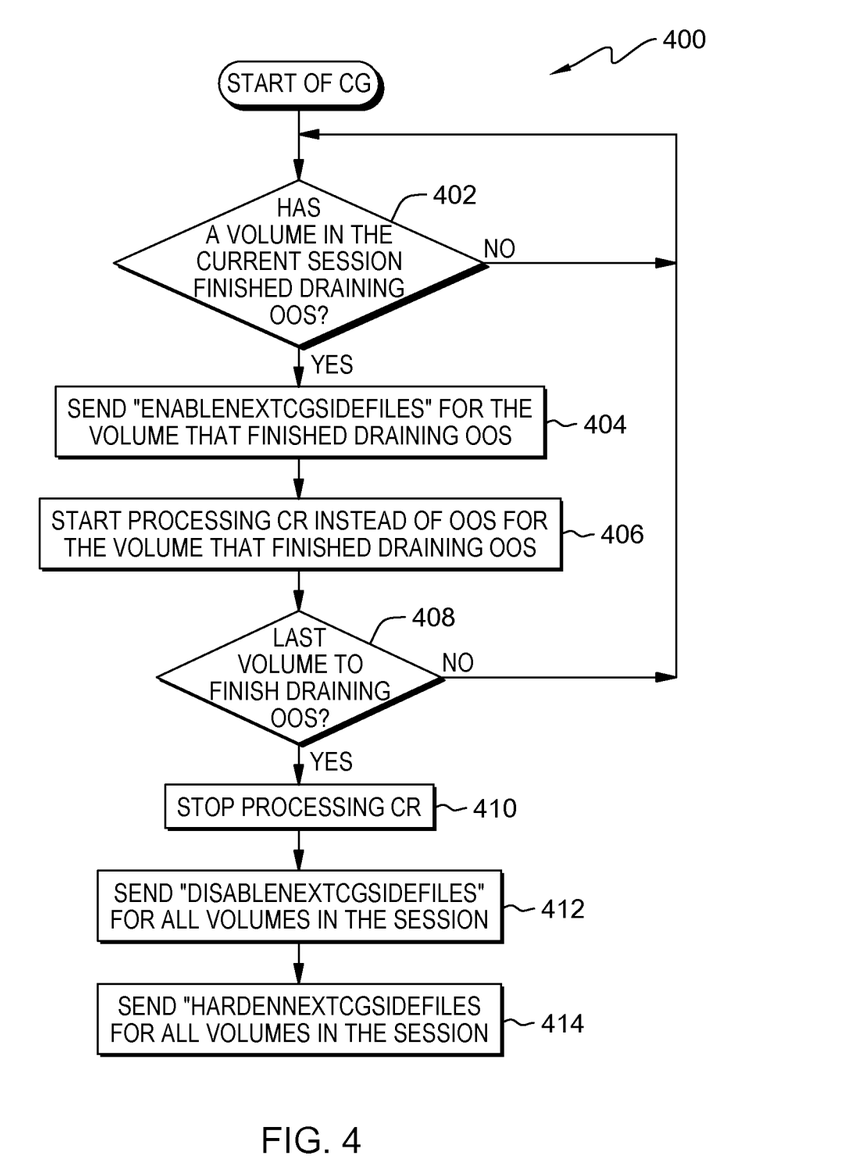
FIG. 4 is a flowchart depicting operational steps of an a method for increasing bandwidth utilization during consistency group formation, within a global mirror environment, in accordance with an embodiment of the present invention.

FIG. 4 is a flowchart of a method 400 depicting operational steps of a method to improve recovery point objective via dynamic usage of bind segments in a global mirror environment, in accordance with an embodiment of the present invention. Looking to step 402, the volume draining detector 206 makes a determination if any of the primary volumes 106 associated with the current consistency group have finished sending their "out of sync" OOS data toward the associated secondary volume 108. If the answer to this determination is no, then step 402 continues checking until at least one of the primary volumes 106 has finished sending their OOS data toward the secondary volume 108. If the answer to this determination is yes, then the method 400 proceeds to step 404.

Continuing at step 404, the method 400 sends an "EnableNextCGSidefiles" from the primary volume 106 toward the associated secondary volume 108. The message directs the primary volume 106, at step 406, to send the writes for the next consistency group toward the secondary volume 108 for storage in the consistency group next sidefiles 302.

Continuing at step 408, the volume draining detector 206 determines if all of the volumes associated with the current consistency group have completed transferring their data. If all the volumes have completed transferring their data then the method 400 continues to step 410, if all the volumes have not completed transferring their data then the method 400 continues to step 402 and looks for the next volume of the current consistency group to complete the transfer of its data.

Continuing at step 410, the method 400 stops processing the change recordings (CR), i.e, the data associated with the consistency group next sidefiles 302 and the method 400 proceeds to step 412. At step 412, the method 400 sends, from the primary storage 102 device, a "DisableNextCGSidefiles" message toward the secondary volumes 108 associated with the secondary storage 104 device. The "DisableNextCGSidefiles" instructs the secondary volumes 108 to prevent any further writes to the consistency group next sidefiles 302. Continuing at step 414, the method 400 sends, from the primary storage 102 device, a "HardenNextCGSidefiles" message toward the secondary volumes 108 associated with the secondary storage 104 device. The "HardenNextCGSidefiles" instructs the secondary volumes 108 to transfer the data contained in the consistency group next sidefiles 302 to the current consistency group stored in the cache and continue processing writes to the cache.

Figure 5:
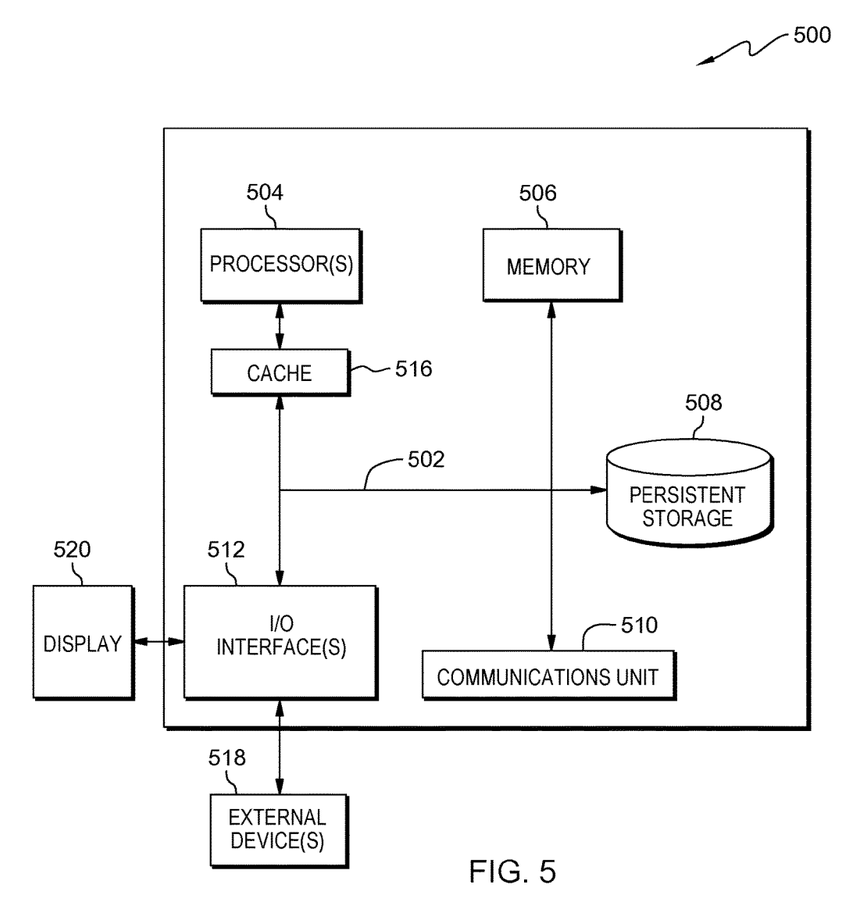
FIG. 5 is a block diagram of components of improved bandwidth utilization during consistency group formation of a global mirror computing environment, in accordance with an embodiment of the present invention.

FIG. 5 depicts computer system 500, an example computer system representative of primary storage 102 device and secondary storage 104 device. Computer system 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Computer system 500 includes processors 504, cache 516, memory 506, persistent storage 508, communications unit 510, input/output (I/O) interface(s) 512 and communications fabric 502. Communications fabric 502 provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of processors 504 by holding recently accessed data, and data near recently accessed data, from memory 506.

Program instructions and data used to practice embodiments of the present invention may be stored in persistent storage 508 and in memory 506 for execution by one or more of the respective processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Program instructions and data used to practice embodiments of the present invention may be downloaded to persistent storage 508 through communications unit 510.

I/O interface(s) 512 allows for input and output of data with other devices that may be connected to each computer system. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to display 520.

Display 520 provides a mechanism to display data to a user and may be, for example, a computer monitor.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality and operation of possible implementations of systems, methods, and computer program products according to various embodiments of the present invention. In this regard, each block in the flowchart or block diagrams may represent a module, segment or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for consistency group formation, the method comprising:
   determining, by one or more primary storage devices, if one or more of a plurality of primary volumes associated with a current consistency group has completed sending out-of-sync (OOS) data towards one or more secondary volumes associated with the plurality of primary volumes, respectively;
   responsive to the one or more of a plurality of primary volumes completing sending OOS data, sending, by the one or more primary storage devices, an "EnableNextCGSidefiles" command, not associated with the current consistency group, toward the plurality of secondary volumes for execution, respectively;
   sending, by the one or more primary storage devices, change recording (CR) data, associated with the next consistency group, toward the secondary volume and storing the CR data in the "NextCGSidefile";
   determining, by the one or more primary storage devices, if the plurality of primary volumes associated with the current consistency group have completed sending out-of-sync (OOS) data towards a plurality of secondary volumes associated with the plurality of primary volumes, respectively;
   responsive to the plurality of primary volumes completing sending OOS data, stop sending, by the one or more primary storage devices, CR data toward the plurality of secondary volumes, respectively;
   sending, by the one or more primary storage devices, a "DisableNextCGSidefiles" command toward the plurality of secondary volumes for execution; and
   sending, by the one or more primary storage devices, a "HardenNextCGSidefiles" command toward the plurality of secondary volumes for execution wherein data in the "NextCGSidefile is transferred to the current consistency group and further writes continue to the current consistency group.

2. The method of claim 1, wherein the "EnableNextCGSidefiles" command generates a storage location in cache space associated with a secondary volume.

3. The method of claim 2, wherein the storage location is a "NextCGSidefile" and future writes are directed, by the one or more primary storage devices, to the "NextCGSidefile."

4. The method of claim 3, wherein the "DisableNextCGSidefiles" command directs, by the one or more primary storage devices, future writes towards a current consistency group associated with a secondary volume.

5. The method of claim 4, wherein the "HardenNextCGSidefiles" command directs, by the one or more primary storage devices, merging data associated with the "NextCGSidefile" with the current consistency group.

6. The method of claim 1, wherein the "HardenNextCGSidefiles" command is sent, by the one or more primary storage devices, to the plurality of secondary volumes for execution wherein the plurality of secondary volumes are associated with a global mirror environment.

7. The method of claim 1, further comprising:
   sending, by the one or more primary storage devices, a "FlushNextCGSidefiles" command toward the plurality of secondary volumes for execution.

8. A computer program product for consistency group formation, the computer program product comprising:

one or more non-transitory computer readable storage media and program instructions stored on the one or more non-transitory computer readable storage media, the program instructions comprising:

program instructions to, determine, by one or more primary storage devices, if one or more of a plurality of primary volumes associated with a current consistency group has completed sending out-of-sync (OOS) data towards one or more secondary volumes associated with the plurality of primary volumes, respectively;

responsive to the one or more of a plurality of primary volumes completing sending OOS data, program instructions to, send, by the one or more primary storage devices, an "EnableNextCGSidefiles" command, not associated with the current consistency group, toward the plurality of secondary volumes for execution, respectively;

program instructions to, send, by the one or more primary storage devices, change recording (CR) data, associated with the next consistency group, toward the secondary volume and storing the CR data in the "NextCGSidefile";

program instructions to, determine, by the one or more primary storage devices, if the plurality of primary volumes associated with the current consistency group have completed sending out-of-sync (OOS) data towards a plurality of secondary volumes associated with the plurality of primary volumes, respectively;

responsive to the plurality of primary volumes completing sending OOS data, program instructions to, stop sending, by the one or more primary storage devices, CR data toward the plurality of secondary volumes, respectively;

program instructions to, send, by the one or more primary storage devices, a "DisableNextCGSidefiles" command toward the plurality of secondary volumes for execution; and program instructions to, send, by the one or more primary storage devices, a "HardenNextCGSidefiles" command toward the plurality of secondary volumes for execution wherein data in the "NextCGSidefile is transferred to the current consistency group and further writes continue to the current consistency group.

9. The computer program product of claim 8, wherein the "EnableNextCGSidefiles" command generates a storage location in cache space associated with a secondary volume.

10. The computer program product of claim 9, wherein the storage location is a "NextCGSidefile" and future writes are directed, by the one or more primary storage devices, to the "NextCGSidefile."

11. The computer program product of claim 10, wherein the "DisableNextCGSidefiles" command directs, by the one or more primary storage devices, future writes towards a current consistency group associated with a secondary volume.

12. The computer program product of claim 11, wherein the "HardenNextCGSidefiles" command directs, by the one or more primary storage devices, merging data associated with the "NextCGSidefile" with the current consistency group.

13. The computer program product of claim 8, wherein the "HardenNextCGSidefiles" command is sent, by the one or more primary storage devices, to the plurality of secondary volumes for execution wherein the plurality of secondary volumes are associated with a global mirror environment.

14. The computer program product of claim 8, further comprising:

program instructions to, send, by the one or more primary storage devices, a "FlushNextCGSidefiles" command toward the plurality of secondary volumes.

15. A computer system for consistency group formation, the computer system comprising:

one or more computer processors;

one or more non-transitory computer readable storage media;

program instructions stored on the one or more non-transitory computer readable storage media for execution by at least one of the one or more computer processors, the program instructions comprising:

program instructions to, determine, by one or more primary storage devices, if one or more of a plurality of primary volumes associated with a current consistency group has completed sending out-of-sync (OOS) data towards one or more secondary volumes associated with the plurality of primary volumes, respectively;

responsive to the one or more of a plurality of primary volumes completing sending OOS data, program instructions to, send, by the one or more primary storage devices, an "EnableNextCGSidefiles" command, not associated with the current consistency group, toward the plurality of secondary volumes for execution, respectively;

program instructions to, send, by the one or more primary storage devices, change recording (CR) data, associated with the next consistency group, toward the secondary volume and storing the CR data in the "NextCGSidefile";

program instructions to, determine, by the one or more primary storage devices, if the plurality of primary volumes associated with the current consistency group have completed sending out-of-sync (OOS) data towards a plurality of secondary volumes associated with the plurality of primary volumes, respectively;

responsive to the plurality of primary volumes completing sending OOS data, program instructions to, stop sending, by the one or more primary storage devices, CR data toward the plurality of secondary volumes, respectively;

program instructions to, send, by the one or more primary storage devices, a "DisableNextCGSidefiles" command toward the plurality of secondary volumes for execution; and program instructions to, send, by the one or more primary storage devices, a "HardenNextCGSidefiles" command toward the plurality of secondary volumes for execution wherein data in the "NextCGSidefile is transferred to the current consistency group and further writes continue to the current consistency group.

16. The computer system of claim 15, wherein the "EnableNextCGSidefiles" command generates a storage location in cache space associated with a secondary volume.

17. The computer system of claim 16, wherein the storage location is a "NextCGSidefile" and future writes are directed, by the one or more primary storage devices, to the "NextCGSidefile."

18. The computer system of claim 17, wherein the "DisableNextCGSidefiles" command directs, by the one or more primary storage devices, future writes towards a current consistency group associated with a secondary volume.

19. The computer system of claim 18, wherein the "HardenNextCGSidefiles" command directs, by the one or more primary storage devices, merging data associated with the "NextCGSidefile" with the current consistency group.

20. The computer system of claim 15, wherein the "HardenNextCGSidefiles" command is sent, by the one or more primary storage devices, to the plurality of secondary volumes for execution wherein the plurality of secondary volumes are associated with a global mirror environment.

* * * * *